Dec. 20, 1955  O. THALMANN  2,727,686
CYCLE COMPUTER
Filed Feb. 8, 1954

INVENTOR:
OTTO THALMANN

United States Patent Office 2,727,686
Patented Dec. 20, 1955

2,727,686

CYCLE COMPUTER

Otto Thalmann, Zurich, Switzerland

Application February 8, 1954, Serial No. 408,975

Claims priority, application Switzerland February 7, 1953

6 Claims. (Cl. 235—88)

This invention relates generally to rotary slide rulers and more particularly to time interval indicating devices.

Devices for indicating the favourable days for a woman to conceive are known both in the form of bar-shaped slide rules and in the form of disc-shaped rotary slide rules.

The hitherto known devices having the form of rotary slide rules are not sufficiently clearly arranged and are therefore liable to cause errors in setting them.

The present invention relates to a rotary slide rule device for indicating the favourable days for a woman to conceive, which is easy to set and is clear enough to be read off with absolute accuracy.

According to the invention this is effected by a scale disc with a circular arrangement of the date numbers of the calendar days extending over two calendar months, also by an orientating slide member pivotally mounted in the centre of the scale disc and having an index for setting to the first day of the menstrual period and at least one cut-away place for setting the menstruation cycle and a marginal cut-away place for displaying the date number scale, and between the scale disc and the orientating slide member and mounted on the pivotal axis of the latter at least one adjustable slide member with the numbers which can be set to the window in the orientating disc and indicate the duration of the menstruation cycle and a sector-shaped window extending over the date number scale for reading off the favourable days for a woman to conceive.

On the orientating slide is set out, suitably at a definite distance from the index a cycle number scale, by the aid of which on the basis of the cycle number in each particular case the start of the next period can be read off on the date number scale.

Figure 1:
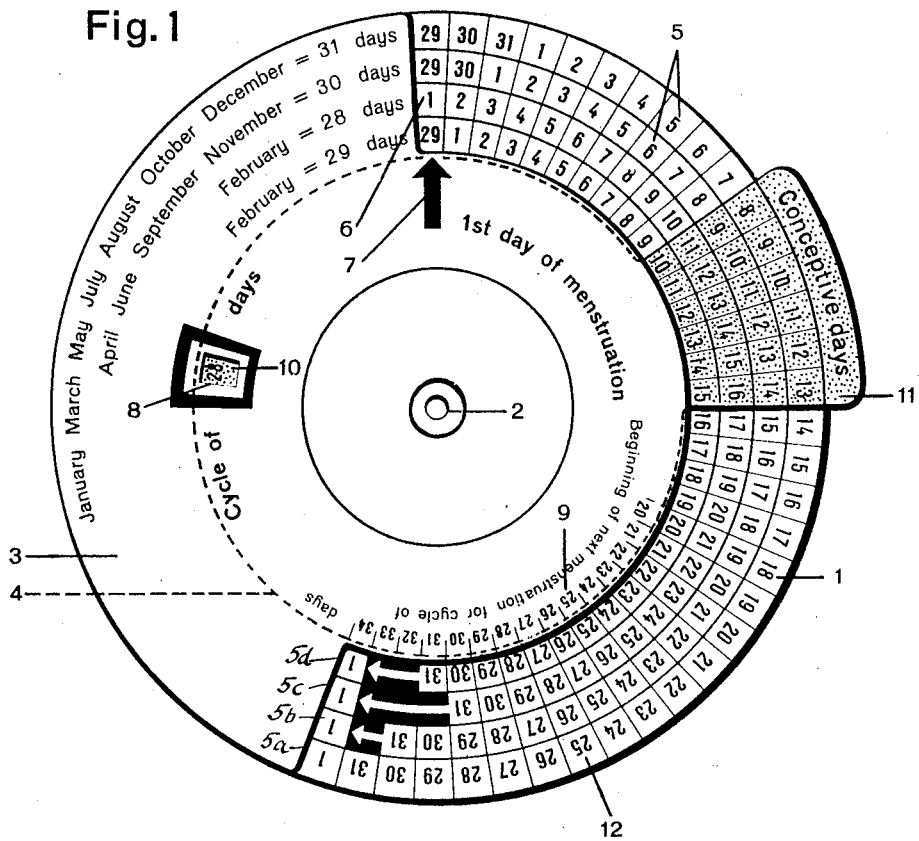

A constructional example of a device according to the invention is illustrated in the accompanying drawing, in which:

Figure 1 shows a general view of the rotary slide rule; and

Figure 2:
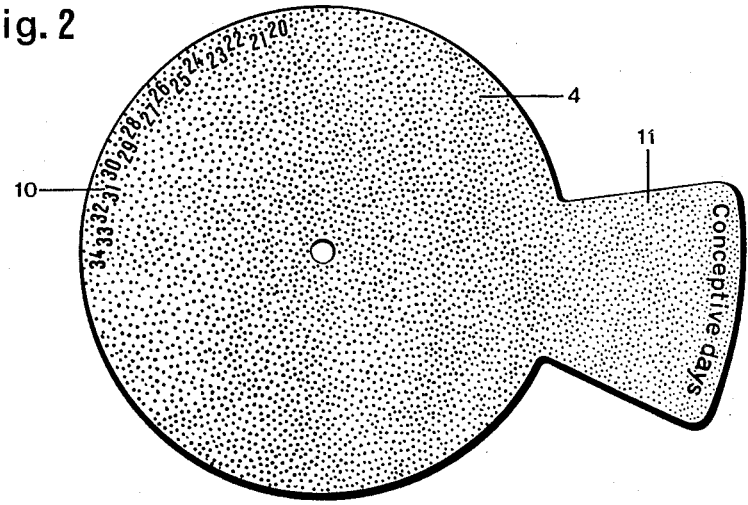

Figure 2 a detail of Figure 1.

The rotary slide rule comprises a scale disc 1, in the centre of which on a spindle 2 are rotatably mounted an orientating slide 3 and between the disc 1 and the slide 3 an adjustable slide 4. The scale disc 1 is marked with an annular scale 5 consisting of four concentric annular scales 5a, 5b, 5c and 5d, which are marked out in date numbers of the calendar days, the outermost scale ring bearing twice the day dates 1 to 31, the second scale ring 5b the day dates 1 to 30 and 1 to 31, the third scale ring 5c the day dates 1 to 28 and 1 to 31 and the fourth scale ring 5d the day dates 1 to 29 and 1 to 31. On the orientating slide 3 are marked the months which refer to the four scale rings 5a–d, and which for this purpose are so grouped that the months with 31 days are assigned to the scale ring 5a, the months with 30 days to the scale ring 5b, February with 28 days to the scale ring 5c and February with 29 days to the scale ring 5d. The orientating slide 3 has a marginal sector 6 cut away, which extends over 35 days of the scale rings 5a–d, and bears at the beginning of the marginal sector an arrow 7, with which the first day of the period is adjusted to on the particular scale ring 5a–d. The orientating slide 3 has a further cut-away place or window 8 bearing the legend "Cycle of . . . days." At the marginal sector 6 the orientating slide 3 is provided with a circular segment-shaped numeral scale 9, the numbers 20 to 35 of which relate to the different duration of the menstruation cycle and allow the start of the next period to be read off in the radial column of the cycle number in question on the particular annular scale 5a–d. This number scale bears the legend "Start of the next period with a cycle of . . . days."

The adjustable slide 4 is marked with a scale of numbers 10 with the numbers 20–35, which relate to the duration of the menstruation cycle. The number in question of the scale 10 can by rotary displacement of the slide 4 be made visible in the window 8 of the slide 3. The adjustable slide 4 may consist of transparent material, such as cellon, cellophane, Celluloid or the like and is provided with a reading-off tongue 11 of circular sector shape, which projects beyond the scale ring 5a–d and is preferably of different colour so as to stand out against the scale disc 1. The position of the tongue 11 with respect to the number scale 10 and the position of the window 8 relative to the marginal sector 6 (arrow 7) is made such that, on the arrow 7 being set to the calendar day of the particular scale ring 5a–d coinciding with the first day of the period and the number of the scale 10 corresponding to the cycle in question being set to show in the window 8, the days which are favourable for a woman to conceive may be read off on the particular scale ring 5a–d in the region of the transparent tongue 11.

In the example illustrated, for instance, the start of the period falls due on the 29th of January and correspondingly the arrow 7 of the slide 3 points to this day of the scale ring 5a. The cycle in question, in this case 28 days, is so adjusted by displacing the rotary slide 4, taken hold of for this purpose preferably by the tongue 11, that the number 28 of the scale 10 appears in the window 8 of the slide 3. The date read off will then be the 8th to the 13th of January as the period of time most favourable for conception or the period of fertility. At the same time in the radial column 12 which corresponds radially to the cycle number 28 of the scale 9 there may be read off on the scale ring 5c the starting day of the next period as the 26th February.

In cases, in which the menstruation period is not always the same, should it for instance vary between 28 and 27 days, the adjustable slide is also set for this second cycle in such a manner that the number 27 appears in the window 8. The adjustable slide 4 will at the same time have turned in the counter-clockwise sense by an angle corresponding to one day, so that the number 7 of the annular scale 5a is also covered by the reading-off window 11. The period of conception will thus extend from the 7th to the 13th of January.

In order that the adjustable slide 4 need not be set twice for the two measurements, instead of one two superposed adjustable slides 4 may be provided, in which case there will be also two scales 10. One slide 4 will then be set to the shortest and the other slide to the longest cycle, when the reading-off windows 11 of the two slides 4 will then cover the date numbers corresponding to the period of conception.

Having thus described the invention, what is claimed as new and desired to be secured by Letters Patent, is:

1. A rotary slide rule device for indicating fertility comprising a scale disc provided with a circular annular arrangement of the date numbers of the calendar days of two calendar months, an orientating slide member pivotally mounted in the center of said scale disc and having an index to set said slide member in position relative to the first day of the menstrual period, said slide member having further at least one window for exposing therein numbers corresponding to the menstruation cycle and having further a marginal cut-out for displaying a portion of the date number scale disc, and at least one adjustable slide member positioned between said scale disc and said slide member and mounted on the pivotal axis of the latter, said adjustable slide member being provided with said menstruation cycle numbers for exposure in said window, to thereby indicate the duration of the menstruation cycle, and a reading-off element forming part of said adjustable slide member and projecting radially beyond the date number scale to thereby disclose the days favorable for the fertility of a woman.

2. A rotary slide rule device according to claim 1, said date number scale including four concentrically arranged scale rings each corresponding to the date numbers of each of two successive months of twice 31 days, 30 and 31 days, 28 and 31 days, and 29 and 31 days, respectively.

3. A rotary slide rule device according to claim 2, said marginal cut-out of said orientating slide member being positioned to expose a portion of the date numbers of each of said scale rings of said date number scale.

4. A rotary slide rule device according to claim 1, said orientating slide member being further provided with a cycle number scale disposed adjacent said marginal cut-out and spaced from said index, said cycle number scale in conjunction with said window and said numbers corresponding to the menstruation cycle serving to indicate on said date number scale the start of the next period.

5. A rotary slide rule device according to claim 1, said adjustable slide member being composed of transparent material, said reading-off element comprising a tongue having the shape of a circular sector and projecting radially over said date number scale.

6. A rotary slide rule device according to claim 1, said reading-off element being transparent and differently colored than said scale disc.

References Cited in the file of this patent

UNITED STATES PATENTS

| | | |
|---|---|---|
| 2,034,027 | Decary et al. | Mar. 17, 1936 |
| 2,118,354 | Manaur | May 24, 1938 |
| 2,350,219 | Brandao | May 30, 1944 |
| 2,493,792 | Walmsley | Jan. 10, 1950 |
| 2,542,943 | Reiner | Feb. 20, 1951 |
| 2,638,272 | Heck | May 12, 1953 |